United States Patent
Murphy et al.

(10) Patent No.: US 7,110,748 B2
(45) Date of Patent: Sep. 19, 2006

(54) TELEPHONE CALL MANAGER

(75) Inventors: Stephen Murphy, Halifax (CA); David Benoit, Halifax (CA); Bradford Spencer, Halifax (CA); Kent Murray, Halifax (CA)

(73) Assignee: America Online, Inc., Dulles, VA (US)

( * ) Notice: Subject to any disclaimer, the term of this patent is extended or adjusted under 35 U.S.C. 154(b) by 2 days.

(21) Appl. No.: 10/239,885

(22) PCT Filed: Apr. 5, 2001

(86) PCT No.: PCT/CA01/00472

§ 371 (c)(1),
(2), (4) Date: Mar. 12, 2003

(87) PCT Pub. No.: WO01/78360

PCT Pub. Date: Oct. 18, 2001

(65) Prior Publication Data

US 2004/0102184 A1    May 27, 2004

(30) Foreign Application Priority Data

Apr. 6, 2000    (CA) .................................... 2304353

(51) Int. Cl.
*H04M 11/10*    (2006.01)
*H04M 7/00*    (2006.01)
*H04Q 7/20*    (2006.01)
*H04L 12/66*    (2006.01)

(52) U.S. Cl. ................ 455/412.1; 455/433; 455/432.3; 370/352; 370/328; 370/338; 379/221.01

(58) Field of Classification Search ............. 455/414.4, 455/435.3, 412.1, 412.2, 415, 417, 433, 432.3; 379/93.23, 212.01, 114.01, 265.02, 88.13, 379/221.01; 370/352, 356, 409, 338, 401, 370/328; 704/500; 709/223
See application file for complete search history.

(56) References Cited

U.S. PATENT DOCUMENTS 5,327,486 A * 7/1994 Wolff et al. ............. 379/93.23

(Continued)

FOREIGN PATENT DOCUMENTS

WO          98 15143          4/1998

(Continued)

OTHER PUBLICATIONS

Lawton, George, "Paving the Information Superhighway's last mile". Apr. 1998. pp. 10-12 and 14.

(Continued)

*Primary Examiner*—George Eng
*Assistant Examiner*—Kiet Doan
(74) *Attorney, Agent, or Firm*—Fish & Richardson P.C.

(57) ABSTRACT

A call management method is provided for giving notification of calls unanswered at a destination telephone number and real-time management options for the unanswered call. When control of a call is passed to a call management server (50), notification of an incoming call is sent to a subscriber associated with a destination telephone (22). Incoming call notification is provided via a wireless data messaging terminal (28) and includes information about the incoming call. The subscriber provides instructions in real-time for routing the incoming call.

7 Claims, 3 Drawing Sheets

U.S. PATENT DOCUMENTS

| | | | |
|---|---|---|---|
| 5,742,905 A | 4/1998 | Pepe et al. | |
| 5,805,587 A | 9/1998 | Norris | |
| 5,809,128 A | 9/1998 | McMullin | |
| 5,930,700 A * | 7/1999 | Pepper et al. | 455/435.3 |
| 5,999,525 A | 12/1999 | Krishnaswamy et al. | |
| 6,014,560 A * | 1/2000 | Kramer | 455/414.4 |
| 6,026,155 A * | 2/2000 | Takeuchi et al. | 379/212.01 |
| 6,128,304 A * | 10/2000 | Gardell et al. | 370/401 |
| 6,144,671 A * | 11/2000 | Perinpanathan et al. | 370/409 |
| 6,157,648 A | 12/2000 | Voit et al. | |
| 6,195,357 B1 | 2/2001 | Polcyn | |
| 6,240,449 B1 * | 5/2001 | Nadeau | 709/223 |
| 6,243,373 B1 | 6/2001 | Turock | |
| 6,256,612 B1 * | 7/2001 | Vo et al. | 704/500 |
| 6,304,637 B1 | 10/2001 | Mirashrafi et al. | |
| 6,400,812 B1 | 6/2002 | Svedberg et al. | |
| 6,421,339 B1 * | 7/2002 | Thomas | 370/352 |
| 6,477,246 B1 | 11/2002 | Dolan et al. | |
| 6,487,196 B1 | 11/2002 | Verthein et al. | |
| 6,490,275 B1 * | 12/2002 | Sengodan | 370/356 |
| 6,625,258 B1 * | 9/2003 | Ram et al. | 379/88.13 |
| 6,738,461 B1 | 5/2004 | Trandal et al. | |
| 6,785,379 B1 * | 8/2004 | Rogers et al. | 379/265.02 |
| 6,856,612 B1 * | 2/2005 | Bjelland et al. | 370/338 |
| 6,879,677 B1 | 4/2005 | Trandel et al. | |
| 6,898,275 B1 | 5/2005 | Dolan et al. | |
| 2001/0043688 A1 * | 11/2001 | Sawatzki et al. | 379/114.01 |
| 2003/0002476 A1 * | 1/2003 | Chung et al. | 370/352 |

FOREIGN PATENT DOCUMENTS

WO            99 31862        6/1999

OTHER PUBLICATIONS

Office Actions from U.S. Appl. No. 09/567,758 dated Aug. 8, 2003, May 20, 2004, and Aug. 15, 2005.

Office Action from U.S. Appl. No. 10/221,784 dated Apr. 8, 2005.

Office Action from corresponding Canadian Application No. 2,304,353, dated Apr. 19, 2006 (5 pages).

* cited by examiner

TELEPHONE CALL MANAGER

CROSS-REFERENCE TO RELATED APPLICATIONS

The present application is related to Canadian Priority Application CA2,304,353 filed on Apr. 6, 2000, the entire contents of which are hereby incorporated herein by reference.

TECHNICAL FIELD

The present invention relates to the field of telephone call management via a wireless data network.

BACKGROUND ART

Systems and methods for managing telephone calls, both wireless and conventional, via a data communication service have been proposed. These systems are very useful in the case where a single telephone is used for both data communication purposes and for a telephone. However, such systems do not provide a call management solution in the case where a user is mobile and unable to answer a call.

With the growing popularity of wireless data network (WDN) services due to decreased cost and increased accessibility, the number of applications using WDNs has increased. These applications include personal digital assistants, handheld computers, wireless modems, and two-way pagers.

WDN devices are similar to wireless telephones in that they are mobile and can be carried by a user. However, using a WDN device for call management allows call processing to occur for both conventional and wireless telephones. For example, using a WDN device for call management provides a method for routing a call destined for a wireless telephone to a conventional telephone in the case where the wireless telephone has been turned off or has a dead battery.

Accordingly, there is a need for a system and method for managing telephone calls over a wireless data network.

DISCLOSURE OF THE INVENTION

It is an object of the present invention to provide a user with the ability to manage telephone calls using a wireless data network.

In accordance with one aspect of the present invention there is provided a call management method for providing notification of calls, destined for a telephone, to a wireless data device associated with said telephone, said wireless data device being connected to a wireless data network in communication with a call management server, said call management method comprising the steps of: notifying the wireless data device when an incoming call is detected on said telephone; receiving an indication of a selected management action via the wireless data device; and processing the incoming call according to the selected management action.

In accordance with another aspect of the present invention there is provided a call management method for providing notification of calls, destined for a telephone in a public switched telephone network (PSTN), to a wireless data device connected to a wireless data network in communication with a call management server having a database of call management service subscribers, wherein said database includes subscriber dial number and corresponding wireless data device address information, said call management method comprising the steps of: obtaining dialed number information about the call from the PSTN; comparing the dialed number information to subscriber dial numbers in the database; and providing a message to a wireless data device having a wireless data device address corresponding to the dialed number information.

In accordance with a further aspect of the present invention there is provided a call management method for providing notification of calls, destined for a telephone, to a wireless data device associated with said telephone, said wireless data device being connected to a wireless data network in communication with a call management server, said call management method comprising the steps of: receiving notification of an incoming call detected on said telephone; providing a list of management actions for the incoming call; and sending an indication of a selected management action for the incoming call.

BRIEF DESCRIPTION OF DRAWINGS

Exemplary embodiments of the invention will now be described in conjunction with the attached drawings, in which.

BEST MODE FOR CARRYING OUT THE INVENTION

Figure 1:
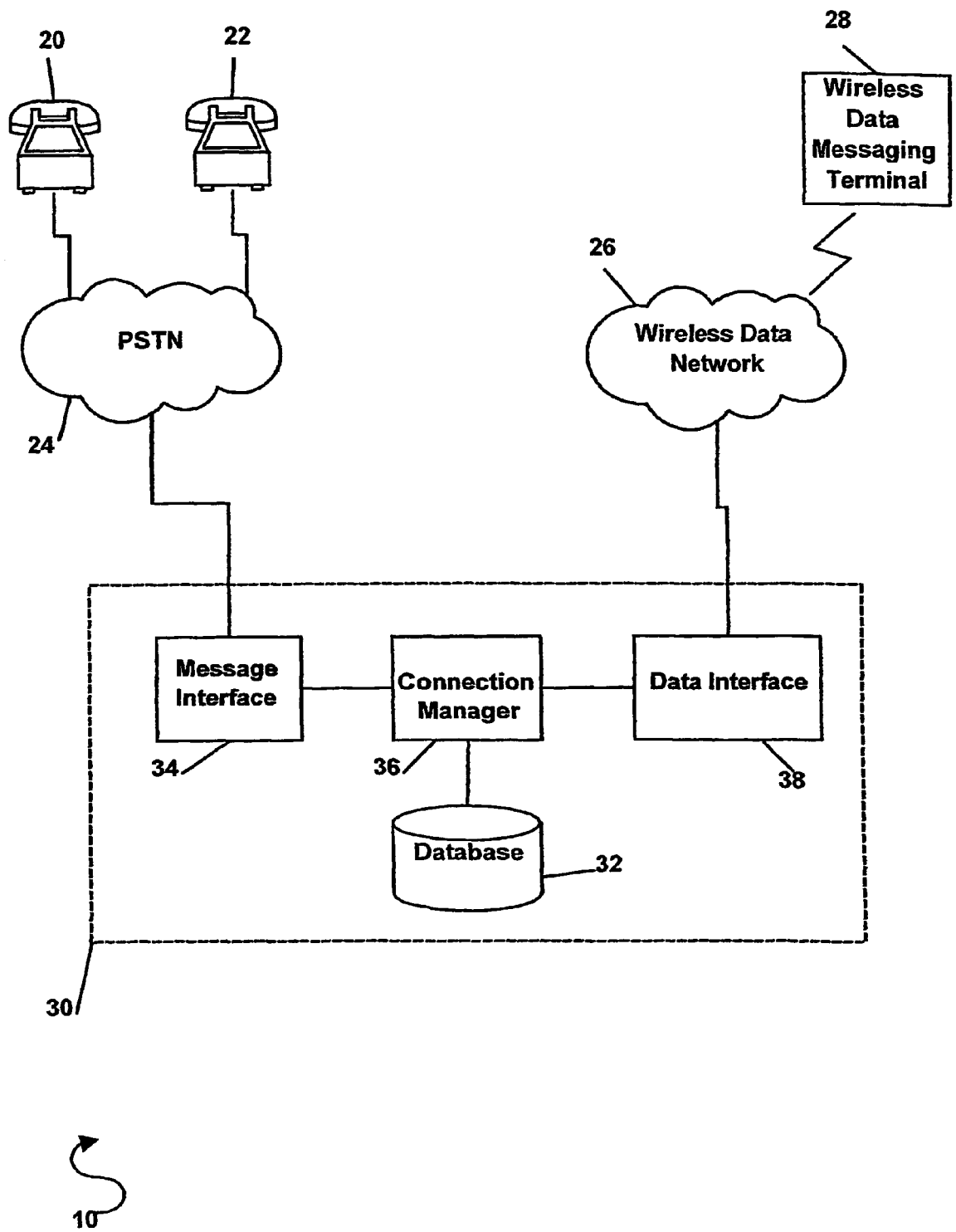
FIG. 1 is a system functional block diagram illustrating logical elements of a telecommunications system according to an embodiment of the present invention.

FIG. 1 illustrates a telecommunications system 10 for real-time telephone call management according to an embodiment of the present invention. A call management server 30 provides a call management service including notification of calls that are not answered at a destination telephone number 22 and real-time management options for the unanswered call.

An origination telephone 20 initiates a call to a destination telephone 22 over a public switched telephone network (PSTN) 24. The origination and destination telephones 20, 22 can be conventional, wireless or a combination of conventional and wireless telephones. The destination telephone 22 belongs to a subscriber of the call management service provided by the call management server 30.

The call management server 30 is connected to the PSTN 24. This connection may be via a telephony link such as Primary Rate Interface (PRI), H.323, Advanced Intelligent Network (AIN) interface or other similar interfaces.

When the PSTN 24 determines that the call placed to the destination telephone 22 is not answered, the PSTN 24 tries to redirect call control to the call management server 30. The PSTN 24 sends information about the call to the call management server 30. This information includes the destination telephone 22 number as well as identification information about the origination telephone 20. A message interface 34 accepts the destination telephone 22 number and validates through a connection manager 36, that the destination telephone 22 belongs to a subscriber of the call management service and that the destination telephone 22 number is registered in a subscriber's information database 32.

When the destination telephone 22 number has been determined to be registered in the database 32, the call control is passed on to the call is management server 30. If the connection between the PSTN 24 and the call management server 30 is via PRI then the call from the origination telephone 20 is redirected from the destination telephone 22 to the message interface 34 of the call management server 30. However, if the connection between the PSTN 24 and the call management server 30 is via AIN or H.323, then the call management server 30 receives signaling information about the call but does not become part of the redirected call path through the PSTN 24. In the later case, the call management server 30 provides routing and call control information to the PSTN 24 for handling the call.

The message interface 34 is the call management server's 30 interface with the PSTN 24 and the origination telephone 20 and accepts information required for the call management process. While the call management server 30 is contacting the subscriber to receive call management instructions the message interface 34 will put the origination telephone 20 on hold or delay answering the call to compensate for the increased latency introduced by using a wireless data network 26. The message interface 34 delivers notification to the connection manager 36 that a call has been attempted to the subscriber's destination telephone 22. The message interface 34 also relays information about the origination telephone 20 to the connection manager 36.

The connection manager 36 accesses the subscriber's record from the database 32. The subscriber's record contains information such as their subscribed telephone number(s) and an identification number for a subscriber's wireless data messaging terminal 28. The subscriber's record may contain additional information such as the type of wireless data messaging terminal that is used or preferred for the subscriber's wireless data messaging terminal 28.

The connection manager 36 finds the name of the call originator based on the origination telephone 20 number provided by the message interface 34. If the call originator's name is not provided by the PSTN 24 and forwarded by the message interface 34, the connection manager 36 formats a query to an external Line Information Database (LIDB) via a private connection or a link such as System Signaling 7 (SS7) (not shown). Information about a call originator's name may optionally be stored in the database 32 residing in the call management server 30.

The connection manager 36 determines the subscriber's wireless data messaging terminal 28 address by matching the destination telephone 22 number with the subscriber records in the database. The connection manager 36 packages the originator's name and telephone number with the wireless data messaging terminal 28 address in a call management message to be sent to the subscriber's wireless data messaging terminal 28.

The connection manager 36 forwards the call management message to the data interface 38. The data interface 38 is connected to a wireless is data network 26 through which the subscriber's wireless data messaging terminal 28 can be contacted. The connection between the data interface 38 and the wireless data network 26 may be via X.25, frame relay, transmission control protocol/internet protocol (TCP/IP), etc. Alternatively, a wireless data terminal (not shown) may be attached directly to the data interface 38 and used as a transmitter to send messages to the subscriber's wireless data messaging terminal 28.

The data interface 38 contacts the subscriber's wireless data messaging terminal 28 via the wireless data network 26 using the address or number provided by the connection manager 36. The data interface 38 sends the call management message to the subscriber's wireless data messaging terminal 28. The subscriber's wireless data messaging terminal 28 is notified of an unanswered call by an alert, such as a tone or vibration.

The subscriber's wireless data messaging terminal 28 address may be, for example, a Mobitex Access Number (MAN) or a device address in a wireless application environment (i.e. GSM, SMS/USSD, IS-136, etc.) The subscriber's wireless data messaging terminal 28 might be, for example, a PDA, a handheld computer, a wireless modem connected to a laptop or desktop computer, a two-way pager, etc.

The data interface 38 is similar to the message interface 34 in that it is a link between the call management server 30 and an external entity. The data interface 38 acts as the interface between the wireless data network 26 which provides access to the subscriber's wireless data messaging terminal 28.

Each possible action for the management of calls correlates with an action identifier. An action identifier corresponding to a chosen call management action is delivered to the data interface 38 upon the subscriber choosing the call management action through the subscriber's wireless data messaging terminal 28.

Upon receiving the action identifier, the data interface 38 forwards the identifier to the communication interface 36. The communication interface 36 validates the identifier and determines whether the identifier correlates to a valid call management instruction. If the action identifier corresponds to a valid action, a signal is transmitted to the message interface 34 which directs the telephone call from the originator to the location specified in the call management instruction.

The possible call management actions can be forwarding a call to a different phone number, forwarding a call to a voice message system, ignoring a call playing a pre-recorded message, etc.

Figure 2:
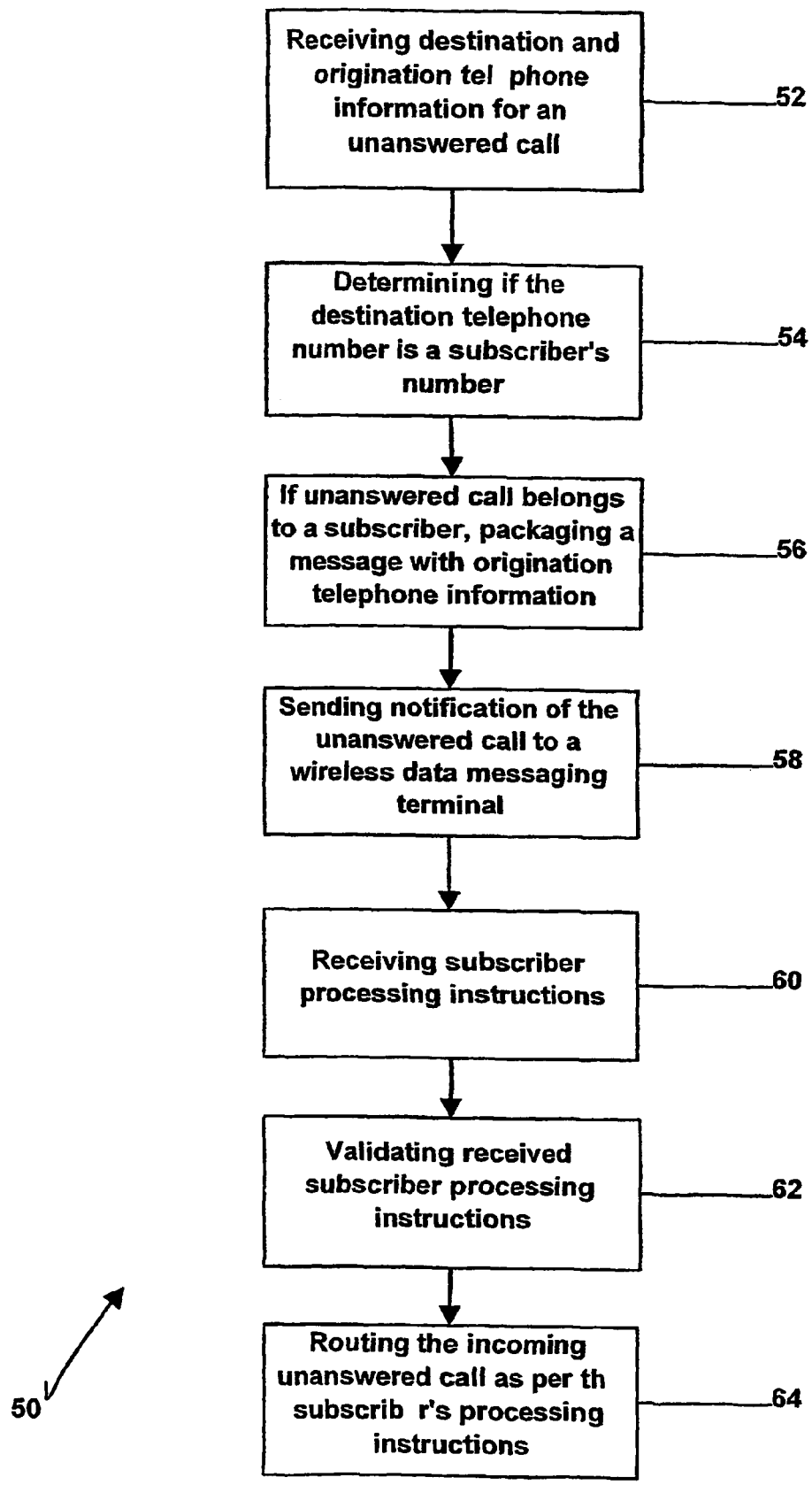
FIG. 2 is a flowchart showing an incoming call management process, from a server perspective, according to an embodiment of the present invention.

FIG. 2 shows a call management method 50 according to an embodiment of the present invention. The call management server 30 receives notification of an unanswered telephone call for a destination telephone 22, in the form of a redirection request for call handling and call management functions. This request includes call information such as the origination and destination telephone 20, 22 numbers shown at step 52 in FIG. 2. The call management server 30 takes the destination number of the unanswered telephone call and determines if the destination telephone 22 is a call management service subscriber shown at step 54.

When it is determined that the destination telephone 22 belongs to a subscriber of the call management service then control of the call is redirected to the call management server 30. A message containing origination telephone information is packaged shown at step 56. The message containing the origination telephone 20 number and name is sent to a subscriber's wireless data messaging terminal 28 belonging to the subscriber associated with the destination telephone 22 where notification of an unanswered call is received shown at step 58.

Possible actions for managing the unanswered call are preset in the subscriber's wireless data messaging terminal 28. These actions may include, but are not limited to, forwarding the call to a different telephone number, forwarding the call to a voice message system, ignoring the call, etc. The subscriber chooses one of these call management actions and sends notification to the call management server 30 of the desired option shown at step 60. The desired call management action is validated by the call management server 30 to determine if the action if a valid management action shown at step 62. The call management server 30 processes the call according to the received instructions if the instruction is deemed to be valid shown at step 64.

Figure 3:
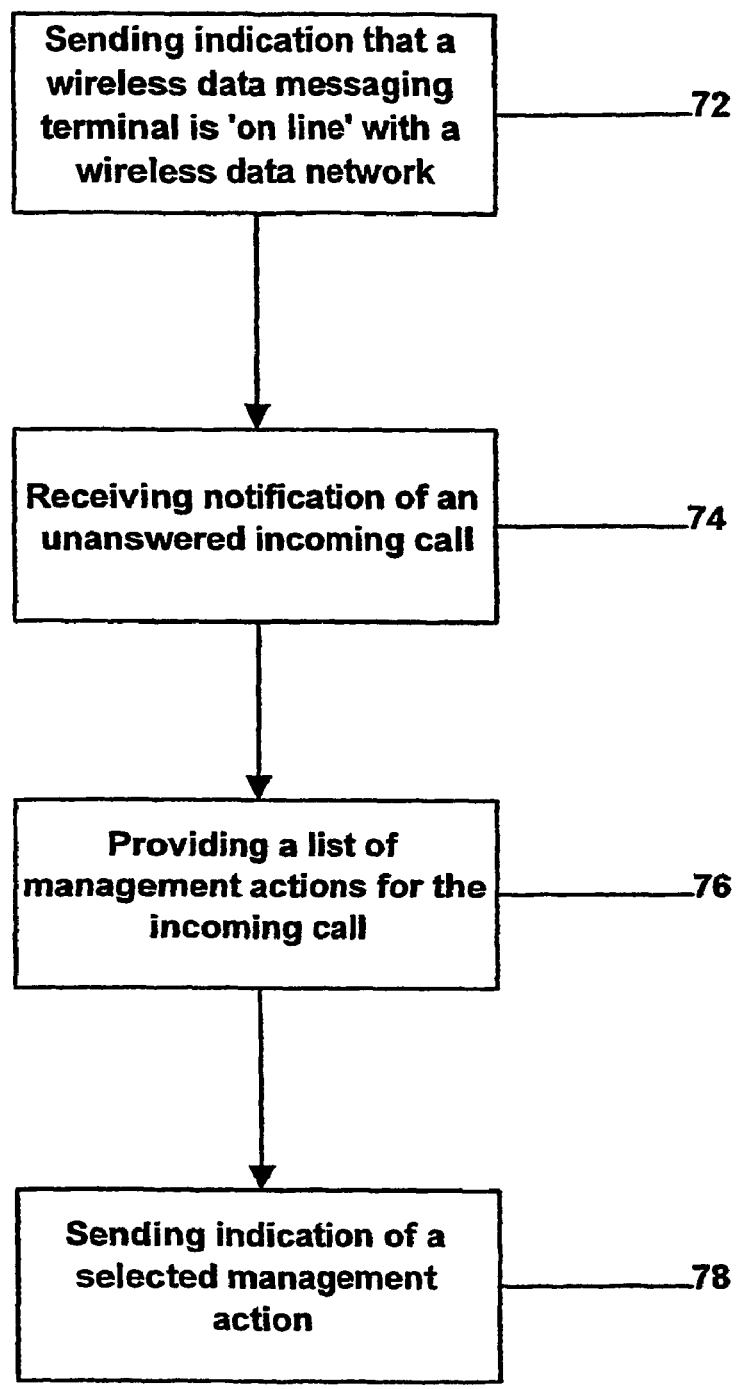
FIG. 3 is a flowchart showing an incoming call management process, from a data terminal perspective, according to an embodiment of the present invention.

FIG. 3 shows the subscriber's wireless data messaging terminal 28 perspective of a call management method 70 according to an embodiment of the present invention. The call management server 30 is informed that the subscriber's wireless data terminal 28 is 'on line' on the wireless data network 26 and continues to update the call management server 30 of any changes in status shown at step 72. When a call requires subscriber management direction, the call management server 30 sends an encoded message to the wireless data messaging terminal 28 which decodes and displays the message, shown at step 74, (including caller name and number information) and alerts the subscriber by tone or vibration. A list of management actions is provided from which a subscriber can choose an action appropriate for the current call, shown at step 76. Once the subscriber has selected an action for the call, the information is encoded and communicated over the wireless data network 26 to the data interface 38 of the call management server 30 for processing of the call according to the received instructions, shown at step 78.

In summary, when a call reaches the call management server 30, the subscriber associated with the destination telephone 22 is notified via a wireless data messaging terminal 28 with information about the incoming call and disposes of the call according to the subscriber's instructions given in real-time.

INDUSTRIAL APPLICABILITY

The present invention as described above in the exemplary embodiments applies to the industrial field of telephone call management.

What is claimed is:

1. A call management method for providing notification of calls, destined for a telephone, to a wireless data device associated with the telephone, the wireless data device being connected to a wireless data network in communication with a call management system, the method comprising:
    receiving an Internet Protocol (IP) telephony call;
    deriving addressing information from signaling information in the IP telephony call;
    analyzing, at the call management system, the addressing information;
    determining, based on analysis of the addressing information performed at the call management system, whether the called party is a subscriber to a call management service;
    querying an external line information database for calling party information with a call originator's name if the call originator's name is not received;
    notifying the wireless data device with the calling party information when the called party is determined to be a subscriber to a call management service;
    receiving, from the wireless data device, an indication of a selected management action; and
    processing the IP telephony call according to the selected management action, further comprising:
    determining whether the selected management action includes an instruction to transfer the IP telephone call to a different destination; and
    using the call management server to prepare an IP routing command that transfers the IP telephony call conditioned on whether the selected management action includes the instruction to transfer the IP telephony call to the different destination.

2. The method of claim 1 wherein receiving an IP telephony call includes receiving an H.323 telephony call.

3. The method of claim 1 wherein analyzing the addressing information to determine whether the called party is a subscriber to the call management service includes:
    determining if the called party is registered with the call management service;
    determining if the wireless data device for the called party is online and connected to the call management server; and
    enabling the call management server to notify the wireless data device in response to determining that the called party is registered with the call management service and the wireless data device is online and connected to the call management server.

4. A system structured and arranged to provide notification of calls, destined for a telephone, to a wireless data device associated with the telephone, the wireless data device being connected to a wireless data network in communication with a call management server, the system comprising:
    a first communications interface structured and arranged to receive an Internet Protocol (IP) telephony call;
    a first signaling interface structured and arranged to derive addressing information from signaling information in the IP telephony call;
    a second signaling interface structured and arranged to analyze, at the call management system, the addressing information;
    a first determination code segment structured and arranged to determine, based on analysis of the addressing information performed at the call management system, whether the called party is a subscriber to a call management service;
    a querying code segment structured and arranged to query an external line information database for calling party information with a call originator's name if the call originator's name is not received;
    a first notification code segment structured and arranged to notify the wireless data device with calling party information when the called party is determined to be a subscriber to a call management service;
    a first instruction code segment structured and arranged to receive, from the wireless data device, an indication of a selected management action; and
    a first processing code segment structured and arranged to process the IP telephony call according to the selected management action, further comprising:
    a second determination code segment structured and arranged to determine whether the selected management action includes an instruction to transfer the IP telephony call to a different destination; and
    a first transferring code segment structured and arranged to use the call management server to prepare an IP routing command that transfers the IP telephony call conditioned on whether the selected management action includes the instruction to transfer the IP telephony call to the different destination.

5. The system of claim 4 wherein the first communications code segment is structured and arranged to receive an H.323 telephony call.

6. The system of claim 4 wherein the first analysis code segment is structured and arranged to:
   determine if the called party is registered with the call management service;
   determine if the wireless data device for the called party is online and connected to the call management server; and
   enable the call management server to notify the wireless data device in response to determining that the called party is registered with the call management service and the wireless data device is online and connected to the call management server.

7. A system structured and arranged to provide notification of calls, destined for a telephone, to a wireless data device associated with the telephone, the wireless data device being connected to a wireless data network in communication with a call management server, the system comprising:
   means for receiving an Internet Protocol (IP) telephony call;
   means for deriving addressing information from signaling information in the IP telephony call;
   means for analyzing, at the call management system, the addressing information;
   means for determining, based on analysis of the addressing information performed at the call management system, whether the called party is a subscriber to a call management service;
   means for querying an external line information database for calling party information with a call originator's name if the call originator's name is not received;
   means for notifying the wireless data device with the calling party information when the called party is determined to be a subscriber to a call management service;
   means for receiving, from the wireless data device, an indication of a selected management action; and
   means for processing the IP telephony call according to the selected management action, further comprising;
   determining whether the selected management action includes an instruction to transfer the IP telephony call to a different destination; and
   using the call management server to prepare an IP routing command that transfers the IP telephony call conditioned on whether the selected management action includes the instruction to transfer the IP telephony call to the different destination.

* * * * *